United States Patent [19]

Lipsztajn

[11] Patent Number: 4,699,701

[45] Date of Patent: Oct. 13, 1987

[54] ELECTROCHEMICAL REMOVAL OF CHROMIUM FROM CHLORATE SOLUTIONS

[75] Inventor: Marek Lipsztajn, Rexdale, Canada

[73] Assignee: Tenneco Canada Inc. (ERCO division), Islington, Canada

[21] Appl. No.: 924,573

[22] Filed: Oct. 29, 1986

[51] Int. Cl.$^4$ .............................................. C25F 5/00
[52] U.S. Cl. ..................... 204/130; 204/97; 204/283; 204/284; 204/95
[58] Field of Search ................ 204/97, 130, 283, 284, 204/95

[56] References Cited

U.S. PATENT DOCUMENTS

| | | | |
|---|---|---|---|
| 3,679,557 | 7/1972 | Gilby et al. | 204/130 |
| 3,899,405 | 8/1975 | Iverson et al. | 204/130 |
| 3,909,381 | 9/1975 | Ehrsam | 204/130 |
| 3,919,062 | 11/1975 | Lundquist et al. | 204/130 |
| 3,966,571 | 6/1976 | Gagnon et al. | 204/130 |
| 4,188,272 | 2/1980 | Moring | 204/130 |
| 4,256,557 | 3/1981 | Soboroff et al. | 204/97 |
| 4,318,789 | 3/1982 | Marcantonio | 204/130 |

FOREIGN PATENT DOCUMENTS 603552   7/1958   U.S.S.R. .............................. 204/97

*Primary Examiner*—R. L. Andrews
*Attorney, Agent, or Firm*—Sim & McBurney

[57] ABSTRACT

Dichromate values, or other soluble hexavalent chromium values, are removed from cell liquor or other aqueous media containing the same by cathodically reducing the same to trivalent chromium, which deposits on the cathode as chromium hydroxide. The cathode has a high surface area three-dimensional structure which exposes the electrolyte to electrolysis for a relatively long period of time. An electrode potential of about 0 volts vs. SCE is applied to the cathode.

12 Claims, 1 Drawing Figure

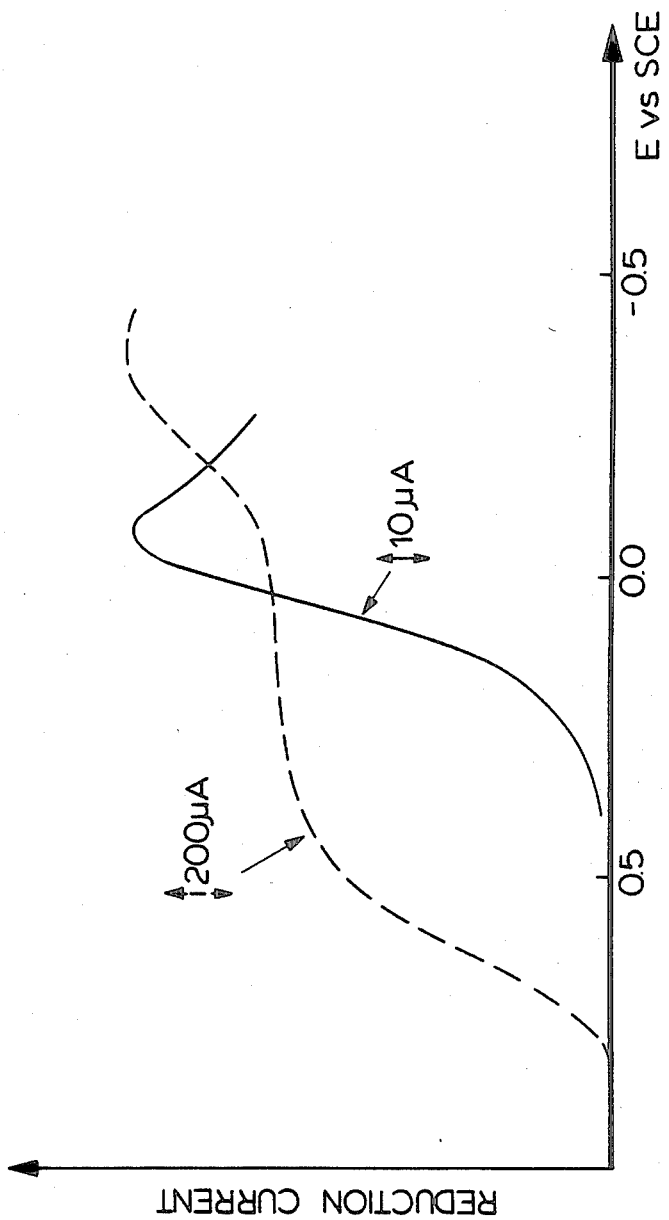

ELECTROCHEMICAL REMOVAL OF CHROMIUM FROM CHLORATE SOLUTIONS

FIELD OF INVENTION

The present invention relates to the removal of hexavalent chromium values, generally in the form of dichromate, from aqueous media containing the same, generally electrolytically-produced aqueous chlorate solutions.

BACKGROUND TO THE INVENTION

An aqueous solution of sodium chlorate and sodium chloride is conventionally produced by the electrolysis of aqueous sodium chloride in diaphragmless electrolytic cells. The extent of electrolysis is controlled to produce an effluent from the cell in which the sodium chlorate and sodium chloride have the desired ratio, usually in the range of about 1:1 to about 20:1 and preferably in the range of about 2:1 to about 15:1. The aqueous solution may be further processed to crystallize out the sodium chlorate for sale in crystal form for a variety of purposes, for example, in the production of chlorine dioxide for use in the bleaching of chemical cellulosic pulps, by reduction in the presence of a strong mineral acid, usually sulphuric acid, or aqueous solution may be used directly for that purpose.

In the electrolysis of sodium chloride to form sodium chlorate, it is conventional to add chromates, usually in the form of sodium dichromate, to the electrolyte in the cell to improve significantly the current efficiency of the cells in the conversion of sodium chloride to sodium chlorate. The cell effluent, also known as "cell liquor", therefore, generally contains significant amounts of chromate ion.

It is desirable to remove chromate ion from the cell effluent before employment of the same in chlorine dioxide generation and it is desirable to recover the chromate ion for reuse in the electrolytic cells. In addition, chromate ions are a toxic pollutant, so that environmental considerations require removal of the chromate ions where discharge of an effluent stream containing such ions may be effected. A number of prior proposals have been made for the removal of chromate ion from cell liquor.

U.S. Pat. No. 3,843,759 teaches a process whereby alkali metal chlorate solutions containing hexavalent chromium are treated with at least a 3-molar proportion of a water-soluble sulfide, such as sodium sulfide, sodium bisulfide, potassium bisulfide or hydrogen sulfide. The solution then is acidified to a pH below about 5, whereby the trivalent chromium is precipitated as an insoluble product, and removed from the solution. In addition to producing trivalent chromium precipitate, elemental sulfur is also precipitated. Further, the cell liquor contains dissolved sulphide ions, which is detrimental in chlorine dioxide production, since the acid medium would tend to form $H_2S$ from the sulfide ions, which then would react violently with the already-unstable chlorine dioxide. In addition, the pH adjustments required to be effected consume large quantities of chemicals and require large capital expenditures.

The problem of elemental sulfur coprecipitation is overcome by the proposal in U.S. Pat. No. 4,268,486 to use hydrazine to reduce $Cr^{VI}$ to $Cr^{III}$ but the problems of undesirable reaction with $ClO_2$ and pH adjustment remain. An additional drawback of this process is that, if the reaction is not carried out quickly enough at the correct pH, then the hydrazine or hydrazine salt is consumed by reaction with the chlorate instead of the $Cr^{VI}$. Hydrazine is also suggested as a suitable reducing agent in Canadian Pat. No. 1,139,080. A similar process, described in German O.S. 3,032,131 discloses hydroxylamine hydrochloride as a reductant but again the same deficiencies exist.

U.S. Pat. No. 4,259,297 describes a process for the removal of hexavalent chromium from alkali metal chlorate solutions by reaction with, inter alia, alkali metal and alkaline earth metal sulfites, bisulfites and dithionites. In this process, an initial pH adjustment to the range of about 9 to about 13 is effected, the reductant is added to form an aqueous slurry of solid particles of trivalent and divalent chromium compounds, the pH of the slurry is adjusted to a value of about 2 to about 4, the pH of the slurry is again adjusted to a value of about 6 to about 8, and the solid particles are removed from the aqueous solution.

The use of low pH's in the range of about 2 to about 4, as required in this prior art, may lead to chlorine dioxide formation from the chlorate cell liquor, which is very hazardous. In addition, no method is provided for the removal of excess reductant and losses of sodium chlorate occur.

In copending U.S. patent application Ser. No. 866,726 filed May 27, 1986 (E185), assigned to the assignee hereof and the disclosure of which is incorporated herein by reference, there is described an effective chemical procedure for the removal of hexavalent chromium from cell liquor in which $Cr^{(III)}$ is formed or precipitated as $Cr(OH)_3$ by reduction of hexavalent chromium under alkaline conditions with a dithionite, under certain specific process conditions.

SUMMARY OF INVENTION

The present invention provides a novel electrochemical process for the removal of dichromates and other forms of hexavalent chromium from cell liquor and other aqueous media containing the same, wherein the aqueous medium is subjected to electrolysis using a high surface area three-dimensional cathode under electrical conditions which favour reduction of hexavalent chromium to trivalent chromium, which precipitates on the cathode as $Cr(OH)_3$. As far as the applicants are aware, there has been no prior proposal to remove hexavalent chromium electrolytically from aqueous chlorate solutions.

In accordance with the present invention, there is provided a method of removing hexavalent chromium from an aqueous medium, usually an aqueous chlorate solution, which comprises reducing the hexavalent chromium to trivalent chromium using a high surface area cathode having a three-dimensional electrolyte-contacting surface polarized with an electrode potential more positive than −1 volt as compared with a saturated calomel electrode (SCE) and more negative than the open circuit potential under the prevailing conditions, and precipitating the trivalent chromium on the electrolyte-contacting surface. Removal of hexavalent chromium may be effected substantially completely or to any desired residual concentration of hexavalent chromium, depending on the length of time for which the electrolyte treatment is effected.

BRIEF DESCRIPTION OF DRAWING

FIG. 1 is a graphical representation of the voltammetric reduction of Cr(VI) and hypochlorite (commonly referred to as "hypo").

GENERAL DESCRIPTION OF INVENTION

The present invention employs cathodic reduction of hexavalent chromium under specific electrolytic conditions using a cathode of specific construction. The electrode employed is one having a high surface area and a three-dimensional electrolyte-contacting surface. The term "high surface area" in relation to the cathode refers to an electrode of the type wherein the electrolyte is exposed to a large surface area of electrode surface in comparison to the physical dimensions of the electrode. The electrode is formed with interstices through which the electrolyte flows, and so has a three-dimensional surface of contact with the electrolyte.

The high surface area cathode used in this invention may be the so-called "flow through" type, wherein the electrode is formed of electroconductive porous material, for example, layers of electroconductive cloth and the electrolyte flows through the porous structure while being subjected to electrolysis, and thereby is exposed to the high surface area of the mesh of the electrode.

The high surface area cathode used in this invention also may be the so-called "flow by" type, wherein the electrode comprises a packed bed of individual electroconductive particles, and the electrolyte flows through the packed bed while being subjected to electrolysis, and thereby is exposed to the high surface area of the electroconductive particles in the packed bed.

The high surface area of the cathode permits the electrolyte to contact the cathode for an extended period of time, so as to permit electrolytic reduction of the hexavalent chromium to trivalent chromium to occur. The trivalent chromium forms insoluble chromic hydroxide, which deposits on the cathode. Low residual Cr(VI) concentrations in the aqueous chlorate solution can be achieved using this invention.

The surface area employed and the conditions of operations of the electrolytic cell depend on the concentration of hexavalent chromium present in the liquor to be treated. Depending on the cell capacity, the electrolyte may be circulated a number of times through the high surface area cathode to remove the dissolved hexavalent chromium.

For a packed bed cathode using electroconductive particles, the surface area usually varies from about 50 to about 500 sq.cm/cc, preferably about 100 to about 200 sq.cm/cc.

The flow rate of catholyte in contact with the high surface area cathode may vary widely and generally the linear catholyte flow rate is about 10 to about 1000 cc/min.

The electrolytic cell in which the chromium removal is effected in accordance with this invention may have any desired construction consistent with the requirement that the cathode have a high surface area, so as to provide a long flow path for the catholyte in contact with a three-dimensional network of electrode surface.

The cell may be provided with a separator, for example, an ion-exchange membrane, usually a cation-exchange membrane, separating the anode compartment from the cathode compartment, so as to prevent interaction of gases produced at the anode and the electroreduction at the cathode. With a divided cell, the anolyte may be any desired electrolyte, typically an acid medium, or fresh brine may be fed to the anodic compartment with the effluent therefrom then passing to the chlorate cells.

The anode of the cell may be constructed of any desired material, for example, graphite or metal. The flow rate of anolyte through the anode compartment may vary widely and typically is about 10 to about 1000 cm/min.

It is critical to the process of the present invention to employ a cathode potential vs. SCE more positive than $-1$ volt, otherwise continous chromium deposition does not occur. The cathode potential is also required to be more negative than the open circuit potential under the prevailing conditions. This value varies, depending on the pH of the aqueous medium and the concentration of chromium (VI) ions and other ionic species in the aqueous medium. Usually, the electrode potential is about 0 volts vs. SCE. The material of construction of the cathode makes little practical difference to the process and may comprise graphite or various electroconductive metals, alloys, oxides or compounds.

The voltage which is applied between the anode and cathode to provide the desired electrode potential depends on the materials of construction of the cathode and anode as well as cell design but generally is of the order of 2 to 3 volts and the superficial current density is about 200 to 300 A/m$^2$.

The present invention is capable of removing hexavalent chromium from any aqueous medium containing the same. The process has paricular utility with respect to the removal of hexavalent chromium from electrolytically produced aqueous chlorate solutions, usually aqueous solutions of sodium chlorate and sodium chloride produced by electrolysis of aqueous solutions of sodium chloride in the presence of hexavalent chromium, usually in the form of sodium dichromate ("cell liquor").

As is described in detail in copending U.S. patent application Ser. No. 924,574 filed Oct. 29, 1986 (E184), assigned to the assignee hereof and the disclosure of which is incorporated herein by reference, such electrolytically-produced cell liquor also contains hypochlorite. As is described in said copending application, such hypochlorite may be removed electrolytically under certain electro-potential conditions, following an initial removal of the majority of such hypochlorite by heating, if desired. The process of the copending application is effected using a cathode polarized with an electrical potential more positive than $-1$ volts as compared with SCE and more negative than the open circuit potential.

In acordance with one embodiment of the present invention, electrolytic removal of dichromate from cell liquor is effected either sequentially following or simultaneous with electrolytic removal of hypochlorite, depending on the electrode potential conditions and the nature of the electrode material employed, as is more fully described in said copending application.

The pH of the medium which is treated electrolytically in accordance with the invention is not critical and the chromium removal may be effected over a wide range of pH values from about 4 to about 12. As a practical matter, the electrolytic treatment usually is effected at the pH desired for the treated solutions. The temperature of the aqueous medium also is not critical to the process, although higher removal rates of hexavalent chromium occur at higher temperatures.

When the three-dimensional high surface area electrode begins to lose its effectiveness with respect to chromium removal, as the deposited chromic hydroxide takes up a larger proportion of the exposed electrode surfaces, the cathode may be regenerated by removal of the deposited trivalent chromium by conversion to soluble hexavalent chromium. In this way, substantially all the removed chromium values are recovered for reuse in the electrolytic production of the aqueous chlorate solution.

Such cathode regeneration may be achieved effectively by circulating a solution containing dissolved chlorine or hypochlorite, preferably under alkaline conditions, through the electrode. As is described in more detail in copending U.S. patent application Ser. No. 924,572 filed Oct. 29, 1986 [E187], assigned to the assignee hereof and the disclosure of which is incorporated herein by reference, in the electrolytic production of sodium chlorate using metal anodes at elevated temperatures, a considerable volume of liquid condensate results which has significant concentration of hypochlorous acid and represents a serious disposal problem.

As discussed in that patent application, the liquid condensate may be used to form hexavalent chromium for the electrolysis process by reaction of the hyprchlorite in the condensate with a source of trivalent chromium. In accordance with one embodiment of this invention, liquid condensate is used as the regeneration medium for the high surface area cathode and the hexavalent chromium solution that results may be used to provide a source of such material for further electrolysis of sodium chloride to form aqueous sodium chlorate solution. In the oxidation of the deposited trivalent chromium to the hexavalent chromium, the hypochlorite ions are reduced to chloride ions.

A further source of hyprchlorite oxidant for the trivalent chromium deposited on the cathode is the hypochlorite present in the chlorate cell liquor, either before or after dehypoing at high temperature.

The process of the prior U.S. application Ser. No. 924,574 [E184] and that of this application may be combined into a large scale operation, wherein several cells effect alternate electrochemical dehypoing and chromium removal, continued up to saturation of the three-dimensional electrode with deposited trivalent chromium, followed by chemical regeneration of the electrode using hypo, so as to effect chemical dehypoing and simultaneous recovery of hexavalent chromium values.

Although the invention is described mainly with respect to the removal of chromium values form sodium chlorate solutions containing sodium chloride, since these are the chromium-containing solutions most commonly encountered and hence the ones to which the present invention has greatest applicability, the present invention has broad application to the removal of reducible hexavalent chromium from any aqueous chlorate solution. Such aqueous chlorate solutions include aqueous solutions of alkali metal chlorates, such as sodium chlorate, potassium chlorate, lithium chlorate, rubidium chlorate and cesium chlorate, alkaline earth metal chlorates, such as beryllium chlorate, magnesium chlorate, calcium chlorate, strontium chlorate, barium chlorate and radium chlorate, and mixtures of two or more such chlorates, which may also contain dissolved quantities of alkali metal chlorides, alkaline earth metal chlorides and mixtures thereof.

The invention has particular application to the treatment of aqueous solutions of sodium chlorate and sodium chloride produced by electrolysis of aqueous sodium chloride solution. As mentioned earlier, such solutions are commonly termed "cell liquor". The concentration of sodium chlorate and of sodium chloride in cell liquor may vary widely, depending on the extent of electroylsis of the initial sodium chloride solution. Generally, the concentration of sodium chlorate present may vary from about 100 to about 750 g/L, preferably about 250 to about 675 g/L, and the concentration of sodium chloride present may vary from about 20 to about 400 g/L, preferably about 50 to about 300 g/L. Typically, cell liquor contains about 600 g/L of sodium chlorate and about 100 g/L of sodium chloride.

The hexavalent chromium present in the aqueous solution of sodium chlorate and sodium chloride, or other aqueous chlorate solutions, is usually added to the electrolyte in the form of sodium dichromate in an amount sufficient to provide a hexavalent chromium concentration in the range of about 0.1 to about 20.0 grams of sodium dichromate per liter of solution, preferably about 0.2 to about 10.0 g/L, typically about 2 g/L. This concentration is decreased by the process of the invention, generally to below about 0.05 g/L.

Although the hexavalent chromium is usually added to the aqueous chloride electrolyte solution in the form of sodium dichromate ($Na_2Cr_2O_7$), other forms of water-soluble hexavalent chromium may be employed, for example, sodium chromate ($Na_2CrO_4$), chromic acid ($CrO_3$), potassium dichromate ($K_2Cr_2O_7$), potassium chromate ($K_2CrO_4$) and mixtures of two or more of such materials may be employed.

The present invention, therefore, achieves ready and rapid electrochemical removal of dichromate ions from cell liquor by cathodically reducing the same using a high surface area three-dimensional cathode and forming chromic hydroxide which deposits on surfaces of the cathode. This process is not attended by any of the prior art problems noted above for many conventional chemical procedures for chromate removal.

EXAMPLES

Example 1

Voltammetric studies were effected on two different aqueous solutions having a pH of about 6.5, namely one containing about 1.3 g/L of hypochlorite and about 1.5 g/L of sodium dichromate and a second aqueous solution containing no hypochlorite and about 8 g/L of sodium dichromate, using a rotating platinum disc electrode having a surface area of 0.196 cm$^2$. The reduction current was plotted against the applied potential for each solution and the results are reproduced as FIG. 1.

It will be seen from this data that the potential at which hypo reduction occurs is quite different from that at which chromium (VI) reduction occurs with the low overvoltage platinum material. It is also seen that the rate of reduction (i.e. a reduction current) is about 100 times higher for hypo than for chromium (VI).

Example 2

A study of the electrochemical removal of chromium from cell liquor at low voltages using a three-dimensional carbon cloth electrode was conducted. The experiments were carried out in a laboratory cell comprising an expanded dimensionally-stable anode and a carbon mesh cathode separated by an ion-exchange membrane of the NAFION-125 type. The cathode comprised five layers of carbon cloth (supplied by Stackpole Ltd.) stacked together and then stitched to a ribbed graphite current distributor. The cathode had an external surface area of 42 sq.cm. although the true and electrically-effective surface area was perhaps 3 to 4 orders of magnitude higher. The electrode had a volume of approximately 25 cu.cm.

The following results were obtained:

(a) Under constant voltage conditions (the voltage was varied between 1.8 and 2.2 volts for a corresponding current of 2 to 3 A with a superficial current density of 200 to 300 A/m$^2$), up to 30% (0.5 g/L) of dichromate was removed from 0.5 L of brine containing no hypochlorates in about 20 minutes. Slightly less, but still a significant amount, of dichromate was reduced in the presence of hypo. While the first 20 minutes of electrolysis resulted in removal of 0.26 g Na$_2$Cr$_2$O$_7$ from 0.5 L of electrolyte, electrolysis for a further 10 minutes did not reduce the chromium content further.

(b) The electrolytic process also was very effective in chromium removal from more dilute solutions (less than 0.5 g/L of Na$_2$Cr$_2$O$_7$), both in the presence and absence of hypo. The concentration of dichromates was reduced from 0.23 g/L to 10 ppm in about 15 minutes in the presence of hypo while, in the absence of hypo, the chromium concentration dropped from 0.41 g/L to 130 ppm in 20 minutes and to about 2 ppm in an additional 25 minutes.

Example 3

A series of experiments was conducted using an electrolytic cell dimensioned 2"×2.5"×2" (depth) and divided into an anode compartment (of volume approximately 0.015 dm$^3$) and a cathode compartment (of volume approximately 0.5 dm$^3$) by a cation-exchange membrane of the "NAFION" (trademark of Du Pont) type. The cathode compartment was packed with graphite particles ("UCAR A-20" (trademark of Union Carbide Corporation)) of mean diameter 1.5 mm. The anode was platinized titanium. Current was provided to the cathode bed by means of a graphite plate distributor.

Catholyte (0.5 L) containing sodium dichromate of varying concentration from 0.4 to 3 g/L was circulated through the cathode compartment at a constant flow rate of 122 mL/min. Either brine (150 g/L NaCl) containing sodium dichromate or synthetic cell liquor (500 g/L NaClO$_3$, 60 g/L NaCl) containing 2.5 g/L Na$_2$Cr$_2$O$_7$ was used in the experiments.

The anode compartment was fed with brine solution (150 g/L NaCl). Most experiments were conducted with pH maintained in the 6 to 7 region using 1N HCl. The electrolyses were carried out in the approximately constant voltage mode using a standard current supply equipment (Hewlett Packard 6024A DC power supply). The voltage was usually varied in the 1.8 to 2.2 volt range although one experiment was conducted at 1.4 volts. The corresponding current was 2 to 3 amps, giving a superficial current density of 200 to 300 A/m$^2$.

Cr(VI) concentration determinations were effected using VIS spectrophotometry. The results obtained are set forth in the following Table I:

TABLE IA

| | ELECTROCHEMICAL REMOVAL OF Na$_2$Cr$_2$O$_7$ FROM CELL LIQUOR | | | | | | | |
|---|---|---|---|---|---|---|---|---|
| No. | TIME (min) | 0 | 5 | 10 | 15 | 20 | 30 | 60 | 120 |
| 1 | I (Amps) | 2.7 | 1.46 | 1.39 | 1.30 | 1.24 | — | — | — |
| | $C_{Na_2Cr_2O_7}$ (g/L) | 0.413 | 0.350 | 0.280 | 0.193 | 0.130 | 0.028 | 0.002 | — |
| | rate of Na$_2$Cr$_2$O$_7$ removal in (g/min) | — | 0.006 | 0.007 | 0.009 | 0.006 | 0.005 | 0.004 | — |
| 2 | I (Amps) | 0.64 | 0.29 | 0.28 | 0.23 | 0.18 | 0.14 | 0.04 | — |
| | $C_{Na_2Cr_2O_7}$ (g/L) | 0.447 | 0.39 | 0.347 | 0.283 | 0.20 | 0.117 | 0.01 | — |
| | rate of Na$_2$Cr$_2$O$_7$ removal in (g/min) | — | 0.006 | 0.004 | 0.006 | 0.008 | 0.004 | 0.002 | — |
| 3 | I (Amps) | 1.45 | 0.70 | 0.39 | 0.39 | 0.34 | 0.27 | — | 0.10 |
| | $C_{Na_2Cr_2O_7}$ (g/L) | 1.240 | 1.062 | 1.018 | 0.94 | 0.81 | 0.72 | — | 0.20 |
| | rate of Na$_2$Cr$_2$O$_7$ removal in (g/min) | — | 0.018 | 0.004 | 0.008 | 0.013 | 0.004 | — | 0.003 |
| 4 | I (Amps) | 1.53 | 0.64 | 0.42 | 0.38 | 0.33 | 0.26 | — | 0.22 |
| | $C_{Na_2Cr_2O_7}$ (g/L) | 1.30 | 1.16 | 1.01 | 0.94 | 0.887 | 0.75 | — | 0.22 |
| | rate of Na$_2$Cr$_2$O$_7$ removal in (g/min) | — | 0.014 | 0.015 | 0.007 | 0.005 | 0.007 | — | 0.003 |

| No. | $\Delta C^*_{Na_2Cr_2O_7}\Delta t$ (g/L MIN) | **$r_{corr}$ | Na$_2$Cr$_2$O$_7$ REMOVED (g) | CE IN % AFTER: | | | | OTHER CONDITIONS |
|---|---|---|---|---|---|---|---|---|
| | | | | 20 | 30 | 60 | 120 MIN | |
| 1 | −0.013 | 0.996 | 0.206 | 15 | — | — | — | Cell voltage V = 1.8–2.0 V<br>t = 25° C.<br>pH = 6<br>catholyte: brine + Na$_2$Cr$_2$O$_7$ |
| 2 | −0.011 | 0.995 | 0.219 | 66 | 70 | 69 | — | V ~ 1.4 V<br>t = 25° C.<br>pH = 6<br>catholyte: brine + Na$_2$Cr$_2$O$_7$ |
| 3 | −0.017 | 0.978 | 0.52 | 59 | 56 | — | 53 | V = 1.8–2.0 V<br>t = 25° C.<br>pH = 6<br>catholyte: brine + Na$_2$Cr$_2$O$_7$ |
| 4 | −0.018 | 0.976 | 0.54 | 57 | 60 | — | 58 | V = 1.8–2.0 V<br>t = 25° C.<br>pH = 6<br>catholyte: brine + Na$_2$Cr$_2$O$_7$ |

TABLE IB

ELECTROCHEMICAL REMOVAL OF Na₂Cr₂O₇ FROM CELL LIQUOR

| No. | TIME (min) | 0 | 5 | 10 | 15 | 20 | 30 | 60 | 120 |
|---|---|---|---|---|---|---|---|---|---|
| 5 | I (Amps) | 1.60 | 0.81 | 0.63 | 0.22 | 0.21 | 0.18 | — | 0.09 |
|  | $C_{Na_2Cr_2O_7}$ (g/L) | 1.290 | 1.093 | 0.97 | 0.90 | 0.86 | 0.77 | — | 0.27 |
|  | rate of Na₂Cr₂O₇ removal in (g/min) | — | 0.020 | 0.012 | 0.007 | 0.004 | 0.004 | — | 0.003 |
| 6 | I (Amps) | 1.80 | 0.60 | 0.46 | 0.40 | 0.36 | 0.31 | 0.22 | 0.18 |
|  | $C_{Na_2Cr_2O_7}$ (g/L) | 2.56 | 2.42 | 2.34 | 2.32 | 2.16 | 2.02 | 1.40 | 1.10 |
|  | rate of Na₂Cr₂O₇ removal in (g/min) | — | 0.014 | 0.008 | 0.002 | 0.015 | 0.007 | 0.010 | 0.005 |
|  | $C_{NaClO_3}$ (g/L) | 497 | — | — | — | — | 482 | — | — |
|  | $C_{NaCl}$ (g/L) | 63.7 | — | — | — | — | 63.1 | — | — |
| 7 | I (Amps) | 1.77 | 0.68 | 0.57 | 0.52 | 0.48 | 0.43 | 0.30 | 0.27 |
|  | $C_{Na_2Cr_2O_7}$ (g/L) | 2.44 | 2.28 | 2.20 | 2.08 | 2.00 | 1.76 | 1.02 | 0.64 |
|  | rate of Na₂Cr₂O₇ removal in (g/min) | — | 0.016 | 0.008 | 0.012 | 0.008 | 0.012 | 0.012 | 0.003 |
|  | $C_{NaClO_3-}$ (g/L) | 481 | — | — | — | — | — | 487 | — |
|  | $C_{NaCl}$ (g/L) | 57.9 | — | — | — | — | — | 61.3 | — |

| No. | $\Delta C^*_{Na_2Cr_2O_7}\Delta t$ (g/L MIN) | **$r_{corr}$ | Na₂Cr₂O₇ REMOVED (g) | CE IN % AFTER: 20 | 30 | 60 | 120 MIN | OTHER CONDITIONS |
|---|---|---|---|---|---|---|---|---|
| 5 | −0.016 | 0.941 | 0.51 | 54 | 57 | — | 61 | V = 1.8–2.0 V<br>t = 25° C.<br>pH not adjusted<br>catholyte: brine + Na₂Cr₂O₇ |
| 6 | −0.019 | 0.996 | 0.73 | 51 | 54 | 78 | 77 | V = 1.8–2.0 V<br>t = 25° C.<br>pH not adjusted<br>catholyte: synthetic cell liquor |
| 7 | −0.023 | 0.999 | 0.90 | 49 | 58 | 77 | 62 | V = 1.8–2.0 V<br>t = 60° C.<br>pH not adjusted<br>catholyte: synthetic cell liquor |

As may be seen from this Table I, the rate of dichromate removal is greater for greater initial concentrations of dichromate. In experiments 1 and 2, dichromate removal was substantially complete, with residual concentrations of less than 2 ppm and 10 ppm respectively.

Experiments 6 and 7 indicate that elevated temperature has a beneficial effect on the Cr(VI) removal rate. These experiments also indicate that sodium chlorate is stable under the conditions of electrolysis.

Following saturation of the bed by deposited trivalent chromium, regeneration was effected by circulating condensate containing NOCl, HCl and Cl₂ from a chlorate cell or the commercial bleach sold under the trademark "JAVEX" through the cathode compartment.

TABLE 2

Cr(VI) RECOVERY FROM THE CATHODE BY CIRCULATING HYPO

| CIRCULATION TIME [MIN.] | Na₂Cr₂O₇ BY ELECTROLYSIS [g/L] | Na₂Cr₂O₇ RECOVERED [g/L] | % RECOVERED |
|---|---|---|---|
| 6 | 0.72 | 0.38 | 53 |
| 12 | 0.72 | 0.56 | 78 |
| 22 | 0.72 | 0.66 | 92 |
| 33 | 0.72 | 0.70 | 97 |
| 40 | 0.72 | 0.70 | 97 |
| 45 | 1.04 | 1.02 | 98 |
| 45 | 1.46 | 1.38 | 95 |

Circulation Rate: 122 ml/min.
Temperature: 25° C.

As may be seen from this Table II, circulation of hypo through the "saturated" bed rapidly recovers over 90% of the chromium values.

SUMMARY OF DISCLOSURE

In summary of this disclosure, the present invention provides an efficient electrochemical method for the removal of hexavalent chromium values from cell liquor or other aqueous media containing the same, by depositing the chromium values as chromic hydroxide on a high surface area, three-dimensional cathode. Modifications are possible within the scope of this invention.

What I claim is:

1. A method for removal of dissolved hexavalent chromium ions from an aqueous chlorate solution produced by electrolysis of an aqueous solution of the corresponding chloride in the presence of hexavalent chromium ions, which comprises cathodically reducing dissolved hexavalent chromium in said aqueous chlorate solution at a pH of about 4 to about 12 to insoluble trivalent chromium using a high surface area cathode having a three-dimensional, electrolyte-contacting surface at an electrode potential more positive than −1 volts as compared with a saturated calomel electrode (SCE) and more negative than the open circuit potential under the prevailing conditions, and depositing said insoluble trivalent chromium on said electrolyte-contacting surface.

2. The method of claim 1, wherein a constant voltage is applied to the cathode and an anode during the electrolytic reduction.

3. The method of claim 2 wherein the applied voltage between the anode and the cathode is of the order of 2 to 3 volts.

4. The method of claim 1 wherein said aqueous chlorate solution is an aqueous solution of sodium chlorate and sodium chloride containing about 100 to about 750 g/L of sodium chlorate and about 20 to about 400 g/L of sodium chloride.

5. The method of claim 4 wherein said hexavalent chromium ions are present in said aqueous solution of sodium chlorate and sodium chloride as sodium dichromate in a concentration of about 0.1 to about 20.0 g/L.

6. The method of claim 1 carried out at an applied cathode potential of about 0 volts.

7. The method of claim 1 wherein said cathode is formed of multiple mesh layers of electroconductive material through the interstices of which percolates the catholyte generally parallel to the current flow.

8. The method of claim 7 wherein said cathode is located in a cell having an anode and an ion-exchange membrane separating a cathode chamber from an anode chamber.

9. The method of claim 7 wherein said mesh layers are constructed of graphite.

10. The method of claim 1 wherein said cathode comprises a packed bed of individual electroconductive particles through which percolates the electrolyte generally perpendicular to the current flow.

11. The method of claim 10 wherein said cathode is located in a cell having an anode and an ion-exchange membrane separating a cathode chamber from an anode chamber.

12. The method of claim 10 wherein said electroconductive particles are graphite particles.

* * * * *